(12) United States Patent
Ganesan et al.

(10) Patent No.: US 9,104,344 B2
(45) Date of Patent: Aug. 11, 2015

(54) CUMULATIVE CONSUMABLE USAGE IN CLOUD-BASED PRINTING SERVICES

(71) Applicant: Hewlett-Packard Development Company, L.P., Houston, TX (US)

(72) Inventors: Kumaravel Ganesan, Bangalore (IN); Rajesh Bhatia, Bangalore (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 13/750,108

(22) Filed: Jan. 25, 2013

(65) Prior Publication Data

US 2014/0211232 A1 Jul. 31, 2014

(51) Int. Cl.
*G06F 3/12* (2006.01)
*G06K 15/00* (2006.01)
*B41J 2/00* (2006.01)

(52) U.S. Cl.
CPC ... *G06F 3/12* (2013.01); *B41J 2/00* (2013.01); *G06F 3/1207* (2013.01); *G06F 3/1259* (2013.01); *G06F 3/1288* (2013.01); *G06F 3/1219* (2013.01); *G06F 3/1239* (2013.01)

(58) Field of Classification Search
None
See application file for complete search history.

(56) References Cited

U.S. PATENT DOCUMENTS

| | | | |
|---|---|---|---|
| 6,529,692 B1 * | 3/2003 | Haines et al. | 399/27 |
| 7,148,977 B2 * | 12/2006 | Zerza et al. | 358/1.14 |
| 7,444,088 B2 * | 10/2008 | Radulski et al. | 399/27 |
| 7,822,645 B2 * | 10/2010 | Claremont et al. | 705/26.1 |
| 8,441,657 B2 * | 5/2013 | Koike | 358/1.14 |
| 8,477,350 B2 * | 7/2013 | Jazayeri et al. | 358/1.15 |
| 8,566,403 B2 * | 10/2013 | Pascal et al. | 709/206 |
| 8,570,572 B2 * | 10/2013 | Shustef et al. | 358/1.15 |
| 2002/0191039 A1 | 12/2002 | Minowa et al. | |
| 2003/0043401 A1 | 3/2003 | Abel et al. | |
| 2005/0039091 A1 * | 2/2005 | Hanaoka | 714/724 |
| 2005/0162685 A1 * | 7/2005 | Heiles et al. | 358/1.15 |
| 2006/0283933 A1 * | 12/2006 | Ueda et al. | 235/375 |
| 2007/0047844 A1 | 3/2007 | Watanabe et al. | |
| 2007/0081828 A1 * | 4/2007 | Radulski et al. | 399/27 |
| 2007/0103716 A1 | 5/2007 | Shiraiwa et al. | |
| 2007/0177197 A1 * | 8/2007 | Murahashi et al. | 358/1.15 |
| 2008/0079989 A1 | 4/2008 | Agnetta et al. | |
| 2008/0180742 A1 * | 7/2008 | Koike | 358/1.15 |
| 2013/0028616 A1 * | 1/2013 | Kunihiro et al. | 399/27 |
| 2013/0114100 A1 * | 5/2013 | Torii et al. | 358/1.14 |

FOREIGN PATENT DOCUMENTS

| | | |
|---|---|---|
| KR | 20070103595 A | 10/2007 |
| WO | WO-2011037715 A2 | 3/2011 |
| WO | WO-2011097047 A1 | 8/2011 |
| WO | WO-2013086685 | 6/2013 |

OTHER PUBLICATIONS

"Printer Usage Monitoring Application," CodePlex, Project Hosting for Open Source Software, Version 11, Jun. 1, 2008, pp. 1-2, Available at: <puma.codeplex.com/>, 2006-2012 Microsoft.
International Search Report and Written Opinion received in PCT Application No. PCT/CN2011/083882, Aug. 30, 2012, 7 pages.

* cited by examiner

*Primary Examiner* — Marcus T Riley
(74) *Attorney, Agent, or Firm* — Law Office of Robert C. Sismilich (57) ABSTRACT

In one example, a cloud-based printing service that calculates cumulative usage data of a consumable.

17 Claims, 8 Drawing Sheets

| Job ID | Job Loc'n Link | User ID | Printer ID |
|---|---|---|---|
| Job_101 | XXXXX | Dave | Ptr_3 |
| Job_102 | YYYYY | Jim | Ptr_1 |

| Printer ID | User ID | Cum. Consumable Usage | | | |
|---|---|---|---|---|---|
| | | C | M | Y | K |
| Ptr_1 | Jim | 20 | 10 | 25 | 5 |
| Ptr_1 | Dave | 10 | 5 | 15 | 25 |
| Ptr_2 | Jim | 15 | 25 | 5 | 30 |
| Ptr_3 | Dave | 35 | 15 | 20 | 10 |
| Ptr_3 | Zeke | 30 | 20 | 10 | 15 |

414 { (Ptr_1 rows)
412 { (Ptr_3 Dave row)
416 { (Ptr_3 Zeke row)

410 ⟶

| Printer ID | Printer-Group ID | Limit |
|---|---|---|
| Ptr_1 | Bldg_A | 150 |
| Ptr_2 | Bldg_B | 300 |
| Ptr_3 | Bldg_B | 500 |

430 ⟶

| User ID | User-Group ID | Limit |
|---|---|---|
| Jim | Mgmt | 800 |
| Dave | Sales | 425 |
| Zeke | Sales | 475 |

CUMULATIVE CONSUMABLE USAGE IN CLOUD-BASED PRINTING SERVICES

BACKGROUND

Organizations and enterprises often have an interest in controlling cost of various consumables used in the course of business. One common class of consumables are those used in printers. Such consumables may include, for example, ink, toner, paper, staples, binding materials, among others.

Cloud-based printing services have come into increasing use. In such a service, web-enabled printers are connected to a network such as the Internet and registered with the printing service. The printing service typically includes rendering services for different types of documents, and as such can allow documents to be sent from light-weight devices such as smart phones or PDAs that typically cannot internally render the document into print data.

However, these printing services are typically not established, operated, or controlled by the organization or enterprise, and thus the printing services may also be used by many users who are not part of the organization or enterprise. Due to these factors, among others, it is difficult for the organization or enterprise to determine or control the consumable usage of its printers which are connected to and registered with the cloud-based printing service.

DETAILED DESCRIPTION

As noted in the Background section, it is difficult for an organization or enterprise to determine or control the consumable usage of its printers which are connected to and registered with a cloud-based printing service that is not established, operated, or controlled by the organization or enterprise, and thus also used by other users who are not part of the organization or enterprise. From the perspective of the enterprise, this situation may be referred to as a hybrid print cloud: the printers of an enterprise can use the cloud-based printing service that is controlled or operated by other than the enterprise.

The organization or enterprise may want to determine and/or control the consumable usage of its fleet of web-connected printers in a number of ways. Some of these include: (1) by printer, regardless of the user whose print jobs are printed on the printer; (2) by user, regardless of the printer on which the user prints his or her print jobs; (3) by a group of printers; and (4) by a group of users. Measuring consumable usage by printer allows those printers which are most and least heavily used to be identified. For example, printers at some locations within the organization may be more heavily utilized than others, and this usage data could allow the appropriate amounts of consumables to be stocked at each location. It could also allow a more heavy-duty or faster printer to be installed at the more heavily-used locations. Measuring consumable usage by user allows the amount of the consumable used by a particular employee to be known. If that employee is found to be using an excessively large amount of the consumable, it might be desirable to place restrictions on the amount of the consumable which that employee uses during a given period of time. In a typical organization, different users belong to different departments of the organization, perform different functions than other users, or work in different facilities. Similarly, a set of printers may be assigned to or associated with a particular department or facility. Thus the organization may desire to monitor and/or control consumable usage by department, facility, or job function. Furthermore, it is desirable for the consumable usage data to be reported and monitored in near-real-time. If the usage data is reported, for example, at the end of a month, quarter, or other billing period, excessive amounts of the consumable may already have been expended by that point, eliminating any ability to control the amount of the consumable used during that period. Where consumable usage data is available in near-real-time, however, corrective action may be taken to limit its use and consequent costs.

As defined herein and in the appended claims, a "printer" shall be broadly understood to mean any mechanism for producing hard-copy output of text, graphics, images, and the like. For instance, a printer may include a plotter, copier, camera, facsimile machines, and all-in-one devices (e.g. a combination of at least two of a printer, scanner, copier, and fax), to name just a few. A printer may include an ink-based printing mechanism such as an inkjet printer; a toner-based printing mechanism such as a laser printer; and electrostatic-based printing mechanism, and many others. The size or scale of the printer can range from commercial printing presses through office printers through personal printers. The hard-copy output may be produced on any type of suitable sheet or roll material, such as paper, card stock, cloth or other fabric, transparencies, mylar, and the like, but for convenience the illustrated examples are described using paper as the print medium.

Referring now to the drawings, there is illustrated an example of a cloud-based printing service which provides the ability to calculate or determine cumulative consumable usage data of a printer, and to control the cumulative consumable use. A user submits a print job to the printing service which, if printing is allowed, generates print data for the print job and sends it to a specified printer. The printing service obtains from the printer the amount of at least one consumable used to print the print job, and then reports to a user, such as for example an administrator of the organization's fleet of printers, the cumulative consumable usage of the printer on which the print job was printed, a user who submitted the print job to the printing service, or a group of such printers or users.

Figure 1:
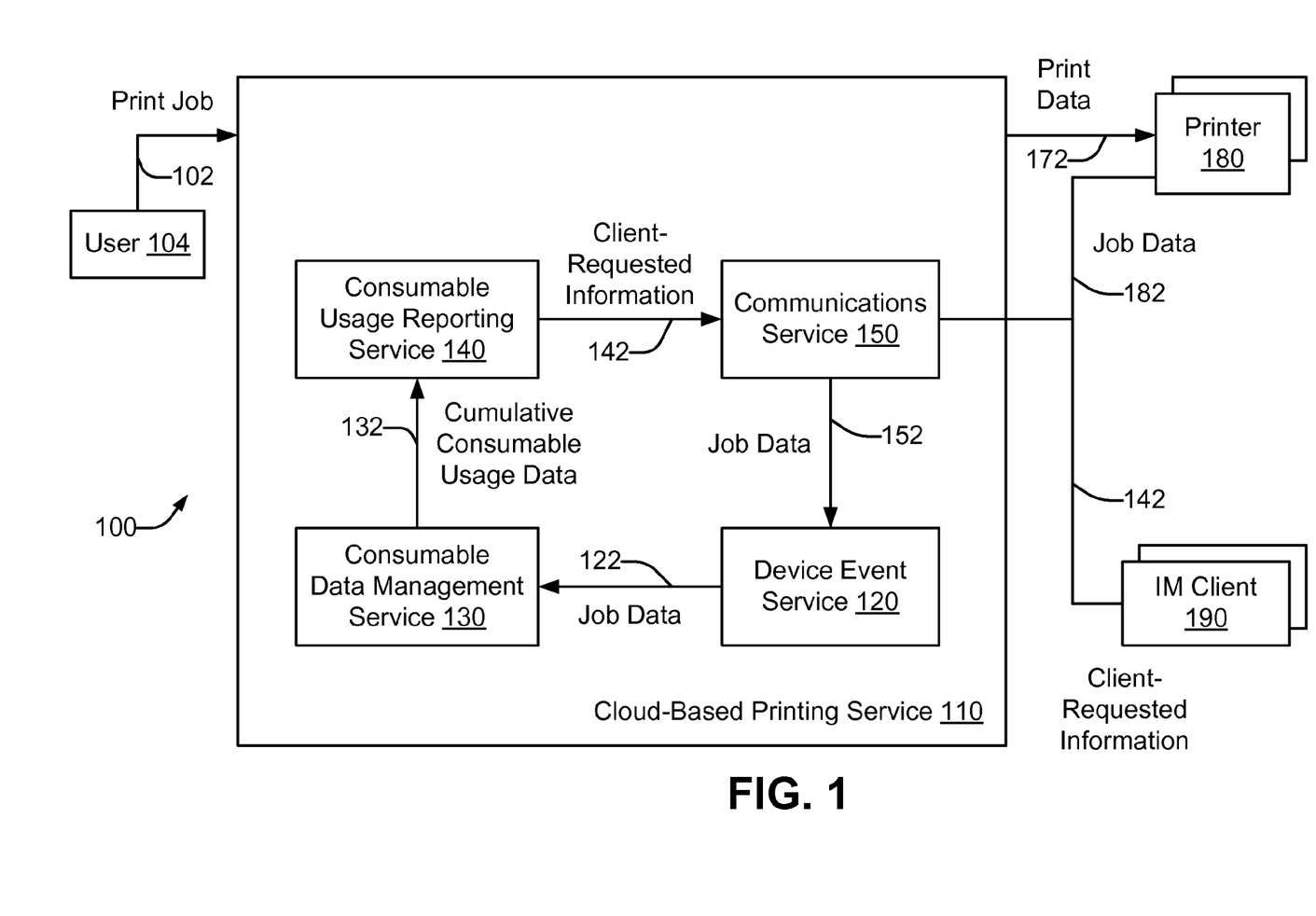
FIG. 1 is a schematic representation of a printing system including a cloud-based printing service in accordance with an example of the present disclosure.

Considering now a printing system according to an example of the present disclosure, and with reference to FIG. 1, a printing system 100 includes a cloud-based printing service 110, at least one printer 180, and at least one client 190. Each printer 180 and each client 190 are communicatively coupled to the cloud-based printing service 110 over a network (not shown), such as for example the Internet.

The cloud-based printing service 110 is configured to receive a print job 102 from a user 104. Typically the user is operating a computing device, such as for example a laptop computer, smart phone, or PDA among many others, and sends the print job 102 from the computing device to the cloud-based printing service 110 over a network, such as for example the Internet. The print job 102 also identifies the user 104, and the printer 180 on which the user 104 wishes to have the print job 102 printed.

The cloud-based printing service (CBPS) 110 includes a device event service 120, a consumable data management service 130, a consumable usage reporting service 140, and a communications service 150.

The CBPS 110 is structured to receive the print job 102 from the user 104 and render the print job 102 into print data 172 printable by the printer 180. The printer 180 has previously been registered with the cloud-based printing service 110 and is structured to receive the print data from the printing service 110 and print the print data to form hard-copy output.

The device event service (DES) 120 is structured to receive from the printer 180 job data 182 indicative of the consumption of consumables in the printer 180 used in the printing of the print job 120 printed by the printer 180 for the user 104. Consumables may include one or more color inks, one or more color toners, one or more types (e.g. material, size, etc.) of print media, one or more types of finishing supplies (e.g. staples, tape, glue, etc.), or any other item which is consumed during the printing process. The supplies of the various consumables in the printer 180 are replaced or replenished from time to time in order to maintain the printer in proper operating condition. In some examples, the job data 182 is received by the communications service 150 and sent to the DES 120 as job data 152. In some examples, the job data 152 is the same as the job data 182, while in other examples, the job data 152 is generated by the communications service 150 processing the job data 182. In some examples, the job data 122 generated by the DES 120 is the same as job data 152, while in other examples, the job data 122 is generated by the DES 120 processing the job data 152.

In some examples, the job data 152,182 may include an initial consumable level of the printer 180 before the print job 102 is printed, and a remaining consumable level at completion of the printing of the print job 102. In this case, the consumable consumption corresponds to the difference between the initial consumable level and the remaining consumable level.

The consumable data management service (CDMS) 130 is structured to calculate, using the job data 122, cumulative consumable usage data 132 associated with the user 104. In some examples, the CDMS 130 is further structured to obtain an identity of the user 104 who submitted the print job 102. The CDMS 130 may also, in some examples, be structured to process and store the job data 152, the identity of the user 104, and in some cases additional data, and store these in a database (not shown) as processed data. In some examples, as will be discussed subsequently with reference to FIG. 4, the processed data may include a first table that associates a printer 180 and a user 104 with cumulative consumable usage data for print jobs 102 from the user 104 that are printed on the printer 180; a second table associating a printer 180 with a printer group; and a third table associating a user 104 with a user group.

The consumable usage reporting service (CURS) 140 is structured to generate, using the cumulative consumable usage data 132, information 142 requested by the client 190 external to the cloud-based printing service 110.

The communications service (CS) 150 is structured to send the information 142 to the client in near-real-time after the completion of the printing. In some examples, the CS 150 processes the client-requested information 142 and conveys the client-requested information 142 to the client 190 in the form of an instant message.

In such examples, the CS 150 is further structured to inform the client 190 about the presence in the cloud-based printing service 110 of an instant message (IM) "friend" who is associated with the information 142 requested by the client 190. The CS 150 is also structured to, responsive to the client 190 opening a "chat session" with the IM friend, instantiate between the IM client 190 and the CURS 140 an IM channel corresponding to the IM friend. The instant message is sent from the CS 150 to the client 190 via the IM channel. Instant message operation will be explained subsequently in greater detail with reference to FIG. 5.

The CS 150 may additionally be structured to communicate with the client 190 via instant messages in an additional way. The CS 150 may receive from the client 190 an instant message that includes a command. The CS 150, in turn, sends the received command to the CURS 140, which processes the command and formulates a response. The CS 150 then receives the response to the command from the CURS 140 and sends the client 190 an instant message that includes the response.

As mentioned previously, the cumulative consumable usage data 132 may be "associated with" the user 104. This association may take a variety of forms. In one form, the cumulative consumable usage data 132 may be the cumulative consumable usage for print jobs 102 submitted to the CBPS 110 by the user 104 on all printers 180. In other words, it is the cumulative consumable usage by the user 104 for print jobs 102 submitted to the CBPS 110 regardless of to which of the printers 180 the print jobs 102 have been directed.

In another form, the cumulative consumable usage data 132 may be the cumulative consumable usage for a predefined group of users that includes the user 104. In other words, it is the cumulative consumable usage by the group of users for print jobs 102 submitted to the CBPS 110 regardless of which of the users in the group submitted the various print jobs 102, and regardless of to which of the printers 180 the various print jobs 102 have been directed.

In yet another form, the cumulative consumable usage data 132 may be the cumulative consumable usage for a predefined group of printers that includes the printer 180 to which the user 104 has directed the print job 102. In other words, it is the cumulative consumable usage by the group of printers regardless of which other users have directed print jobs to the printers 180 in the group of printers.

In some examples, the CBPS 110 may include an on-ramp service (ORS) (not shown) and a worker service (not shown). The ORS is structured to receive the print job 102 from the user 104. Assuming that printing of the print job 102 is allowed, the worker service is structured to receive print content of the print job 102 from the ORS. The worker service is also structured to render the print job 102 into the print data 172 printable by the printer 180. In some examples, the ORS is further structured to either allow the print job 102 to be printed if a consumable usage limit associated with the user 104 has not been exceeded, or to reject the print job 102 without printing it if the consumable usage limit associated with the user 104 has been exceeded. In such examples, the CURS 140 is further structured to compare the consumable usage limit associated with the user 104 with the cumulative consumable usage data 132 associated with the user 104. The ORS and worker service will be discussed subsequently in greater detail with reference to FIG. 2.

Figure 2:
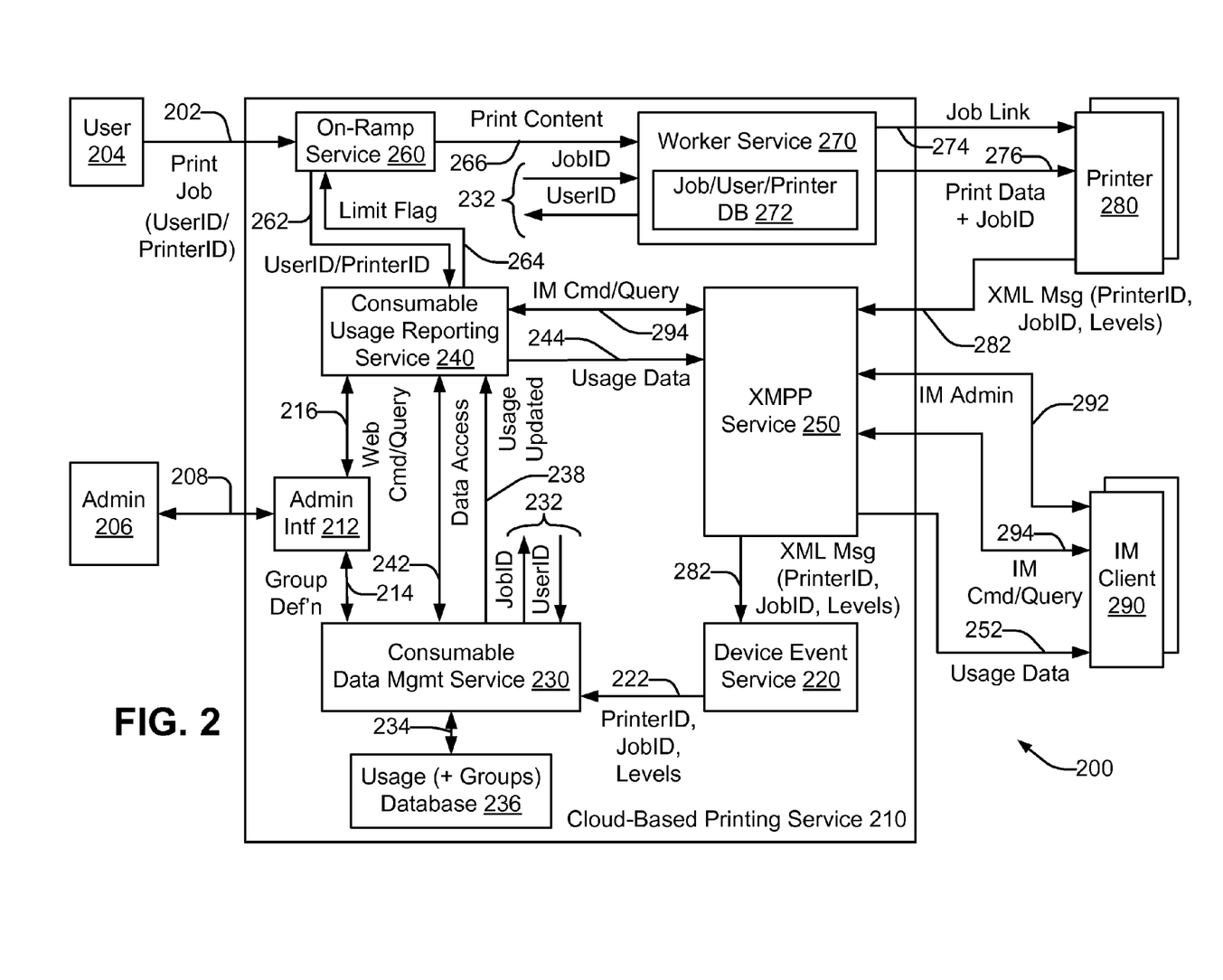
FIG. 2 is a schematic representation of another printing system including a cloud-based printing service in accordance with an example of the present disclosure.

Considering now another printing system according to an example of the present disclosure, and with reference to FIG. 2, a printing system 200 includes a cloud-based printing service 210, at least one printer 280, and at least one instant message (IM) client 290. Each printer 280 and each IM client 290 are communicatively coupled to the cloud-based printing service 210 over a network (not shown), such as for example the Internet.

The cloud-based printing service 210 is configured to receive a print job 202 from a user 204. The print job 202 includes a UserID which identifies the user 204, and a PrinterID which identifies the target printer 280 on which the user 204 wishes to have the print job 202 printed.

The cloud-based printing service (CBPS) 210 includes a device event service (DES) 220, a consumable data management service (CDMS) 230, a consumable usage reporting service (CURS) 240, an XMPP service 250 which serves as a communications service to the printers 280 and the clients 290, an on-ramp service (ORS) 260, and a worker service (WS) 270.

The ORS 260 is structured to receive the print job 202 from the user 204. The ORS 260 sends at least one of the UserID or the PrinterID to the CURS 240 via path 262 to determine whether the print job 202 should be forwarded to the WS 270 for printing, or rejected and thus not printed. This determination is made by the CURS 240 based on whether a predetermined limit for consumable usage by the target printer 280, the user 204, a group of printers that includes the target printer 280, or a group of users that includes the user 204 has been exceeded. The predetermined limit, if any exists, is typically set by an administrator 206 of the fleet of printers 280 of an enterprise or organization, via an administrative interface input 208 of the CBPS 210, or via the IM client 290, as will be discussed subsequently in greater detail. The determination is returned to the ORS 260 as a Limit Flag 264. If the Limit Flag 264 indicates that a consumable usage limit has been exceeded, the ORS 260 rejects the print job 202. Typically, the user 204 is then informed of this decision. If the Limit Flag 264 indicates that no consumable usage limit has been exceeded, then the ORS 260 sends the print content 266 of the print job 202 to the WS 270, which is structured to receive it. Also included as part of, or along with, the print content 266 are the UserID and the PrinterID.

The WS 270 includes, or has access to, rendering services for different types of print content that convert the print content 266 into print data. A different rendering service is typically used for different types of print content. In some examples, the print data is structured according to PCL (printer control language) or PDF (portable document format) standards. The WS 270 stores the print data at a defined location in a job database 272, and assigns a JobID to the print data.

Figure 3:
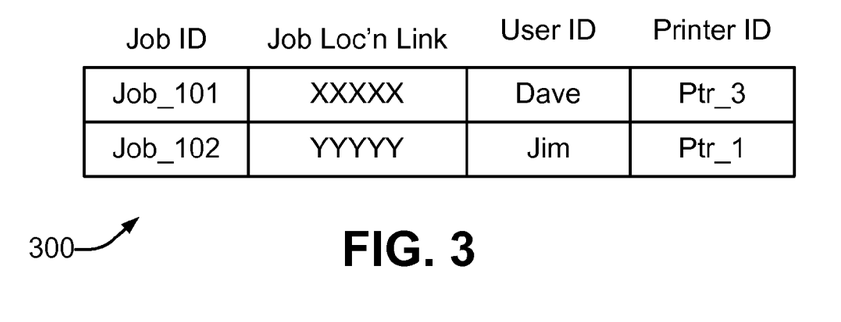
FIG. 3 is a schematic representation of a database table linking a print job to a user and a printer usable with the cloud-based printing system of FIGS. 1 and 2 in accordance with an example of the present disclosure.

Considering one example job database 272 in greater detail, and with reference to FIG. 3, a job database 300 also stores a mapping between the JobID, a link to the location in the job database 300 of the print data, the UserID, and the PrinterID. The example job database 300 illustrates two records for two print jobs 202, identified as "98765" (submitted by user "Dave" to be printed on target printer "Ptr_3"), and "43210" (submitted by user "Jim" to be printed on target printer "Ptr_1").

Referring once again to FIG. 2, the target printer 280, which has previously been registered with the cloud-based printing service 210, is notified by the WS 270 of the availability of the print data. In some examples, the WS 270 attempts to send a notification containing the link to the location in the job database 272 of the print data to the target printer 280 via path 274. If the printer 280 is off-line, the WS 270 will periodically re-send the notification to the target printer 280. When the printer 280 is on-line and after it receives the notification, the printer 280 obtains the print data and the JobID via path 276 from the job database 272 of the WS 270. The printer 280 then prints the print data to form hard-copy output.

The printer 280 is further structured to send job data in the form of one or more XML messages 282 to the DES 220. The XML messages 282 that collectively form the job data are indicative of the consumption of consumables of the printer 280 that were used in the printing of the print job 202 printed by the printer 280 for the user 104. In one example, the printer 280 sends a single XML message 282 immediately following completion of printing of the print job 202 that specifies the amount of various consumables of the printer 280 that were consumed during the printing of the print job 202. In another example, the printer 280 sends two XML messages 282, one after receiving the notification but before printing the print job 202, and another immediately following completion of printing of the print job 202, where each XML message 282 specifies the amount of various consumables remaining in the printer 280. A simplified example of an XML message 282 that specifies the amount of various consumables remaining in a printer 280 having four different color ink consumables is illustrated in Table 1:

TABLE 1

<ConsumableInfo>
<PrinterID>"Ptr_3"</PrinterID>
<JobID>"Job_101"</JobID>
<Counter= ink_C_ConsumablePercentRemaining >
<ConsumablePercentRemaining>100</ConsumablePercentRemaining>
</Counter>
<Counter= ink_M_ConsumablePercentRemaining >
<ConsumablePercentRemaining>23</ConsumablePercentRemaining>
</Counter>
<Counter= ink_Y_ConsumablePercentRemaining >
<ConsumablePercentRemaining>30</ConsumablePercentRemaining>
<Counter>
<Counter=ink_K_ConsumablePercentRemaining >
<ConsumablePercentRemaining>46</ConsumablePercentRemaining>
<Counter>
</ConsumableInfo>

The XML message of Table 1 identifies the message as being associated with PrinterID "Ptr_3" and JobID "Job_101". While these two IDs are illustrated as string values, they could alternatively be numeric values. The four color inks are cyan (C), magenta (M), yellow (Y), and black (K). The message describes that 100% of C ink, 23% of M ink, 30% of Y ink, and 46% of K ink remain in the printer "Ptr_3". In some examples, the XML message may also include information that allows the percentage value to be converted to an absolute unit value, such as for example a number of drops remaining. In some examples, the XML message may include information that specifies whether the XML message describes the consumable levels after receiving the notification but before printing the print job 202, or whether the XML message describes the consumable levels immediately following completion of printing of the print job 202.

The XML messages 282 are received by the XMPP service 250. XMPP (Extensible Messaging and Presence Protocol) is an open XML technology for real-time communication, which powers a wide range of applications including instant messaging, presence, media negotiation, whiteboarding, collaboration, lightweight middleware, content syndication, and other applications. The XMPP service 250 implements XMPP protocol, and facilitates applications including XML message communication and instant messaging. Tigase is one example of an XMPP server that can implement the XMPP service 250.

The DES 220 then receives the XML message 282 from the XMPP service 250 and parses it. For an XML message 282 which provides job data in the form of remaining consumable levels as in Table 1, the DES 220 parses it to determine the PrinterID, JobID, and the remaining consumable levels. The DES 220 then sends this information to the CDMS 230 via path 222.

The CDMS 230 is structured to calculate, using one or more XML messages 282, cumulative consumable usage data associated with the user 204, and store or update this usage data in a usage database 236 via path 234. Since the UserID of the user 204 is not included in the XML messages 282, the CDMS 230 queries the job database 272 of the WS 270 via path 232 by providing the JobID as a key to obtain the corresponding UserID of the user 204 who submitted that print job 202. It can be appreciated that the records in the job database 300 may be retained for some time after the print job 202 has been printed, so that the UserID associated with an XML message related to the print job 202 and identifying the user 204 can still be obtained after the print job 202 has been printed. In some examples, the records may be maintained even if the print data has been deleted after being printed.

Figure 4:
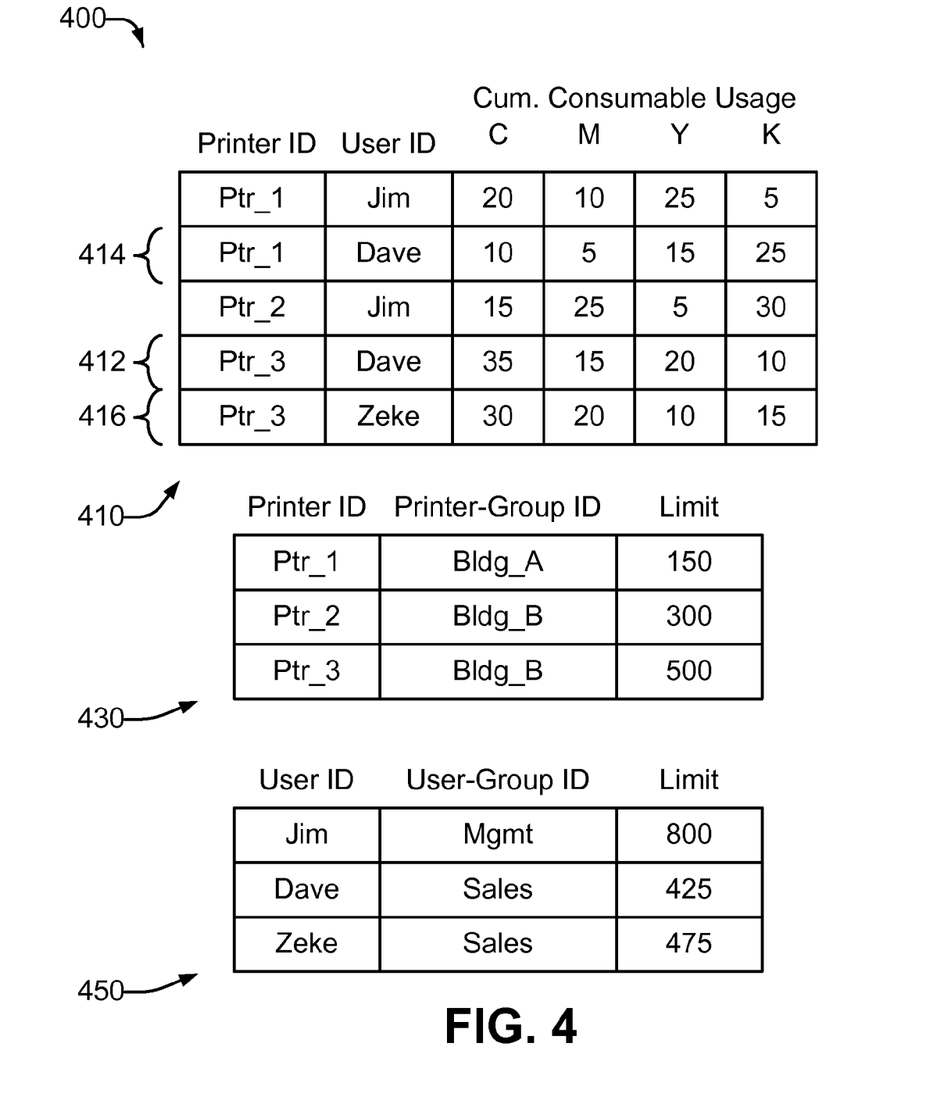
FIG. 4 is a schematic representation of database tables linking printers and users to group of printers and users and to usage data for cumulative amounts of consumables usable with the cloud-based printing system of FIGS. 1 and 2 in accordance with an example of the present disclosure.

Considering one example of the usage database 236 in greater detail, and with reference to FIG. 4, a usage database 400 includes a usage table 410 that associates a PrinterID and a UserID with cumulative consumable usage data for print jobs 202 submitted by the user 204 who corresponds to the UserID and which are printed by the printer 280 that corresponds to the PrinterID.

For example, consider the cumulative consumable usage on printer "Ptr_3" by user "Dave". Record 412 of table 410 illustrates that 35 units of consumable C, 15 units of consumable M, 20 units of consumable Y, and 10 units of consumable K, which represent the amounts of different color inks, have been previously expended for print jobs submitted by "Dave" which were printed on "Ptr_3". Assume that, based on one or more XML messages 282 sent by "Ptr_3" and associated with a print job 202 having a JobID "Job_101" that corresponds (in the job database 272) to the UserID of "Dave", the CDMS 230 determines that 5 units of consumable C, 10 units of consumable M, 15 units of consumable Y, and 20 units of consumable K were used to print the print job 202. The CDMS 230 then updates record 412 to indicate consumable C usage of 35+5=40 units; consumable M usage of 15+10=25 units; consumable Y usage of 20+15=45 units; and consumable K usage of 10+20=35 units.

With regard to how the number of units of the consumables used to print the print job 202 is obtained, consider an example in which the consumable usage information for a given print job 202 is determined from two XML messages 282. One XML message 282 that specifies the remaining consumable levels in the printer 280 is sent before the print job 202 is printed, and a second XML message 282 that specifies the remaining consumable levels in the printer 280 is sent immediately after the print job 202 is printed. Such XML messages 282 may take the form illustrated in Table 1. The amount of consumables used for the print job is determined by the difference in remaining consumable levels between the two XML messages 282.

For example, assume that the remaining consumable levels in the printer 280 are as illustrated in Table 2:

TABLE 2

|  | C | M | Y | K |
|---|---|---|---|---|
| Before: | 100% | 23% | 30% | 46% |
| After: | 99% | 21% | 27% | 42% |

In addition, assume that each 1% change in remaining consumable level equals a 5 unit change, a relationship that may be stated in the XML messages 282. So for this example, the CDMS 230 determines that 5 units of consumable C, 10 units of consumable M, 15 units of consumable Y, and 20 units of consumable K were used to print the print job 202. The CDMS 230 then updates record 412 to indicate consumable C usage of 35+5=40 units; consumable M usage of 15+10=25 units; consumable Y usage of 20+15=45 units; and consumable K usage of 10+20=35 units.

After storing the updated usage data in the usage database 236, the CDMS 230 notifies the CURS 240 via path 238 that the usage data has been updated. In response, the CURS 240 determines what, if any, usage data is to be communicated from the CBPS 210 to the IM Client 290, as will be discussed subsequently with reference to FIG. 5. If usage data is to be communicated, the CURS 240 accesses the usage database 236 via the CDMS 230 at path 242 to obtain the desired usage data. Where the usage data to be communicated to the IM Client 290 is cumulative usage data for a user 204 across multiple printers 280, a printer 280 by multiple users 204, a group of users 204, or a group of printers 280, the CURS 240 obtains all the relevant cumulative usage data from the usage database 236 and aggregates it in the appropriate manner to generate the cumulative usage data for the user 204, the printer 280, the group of users 204, or the group of printers 280. The CURS 240 then sends to the XMPP service 250 the usage data 244 that is to be communicated to the IM Client 290.

Before considering the interaction of the XMPP service 250 with the IM Client 290, groups are discussed further. With regard to groups of printers or users, and with reference again to FIG. 4, the usage database 236 includes a printer-group table 430 that associates a printer 280 with a printer group. The example printer-group table 430 specifies that the printer 280 which has the PrinterID "Ptr_1" is in the Printer-GroupID "Bldg_A", while the printers 280 that have the PrinterIDs "Ptr_2" and "Ptr_3" are in the Printer-GroupID "Bldg_B". The usage database 236 also includes a user-group table 450 that associates a user 204 with a user group. The example user-group table 450 specifies that the user 204 who has the UserID "Jim" is in the User-GroupID "Mgmt", while the users 204 who have the UserIDs "Dave" and "Zeke" are in the User-GroupID "Sales". The printer-group table 430 and the user-group table 430 are typically defined by an administrator 206 of the fleet of printers 280 of the enterprise or organization. The administrator 206 may specify these groups by interacting over the web (i.e. through the Internet) with an administrative interface (AI) 212 of the CBPS 210 via path 208. In one example, the AI 212 may have direct access to the usage database 236 via path 214. In another example, the AI 212 may access the usage database 236 via the CDMS 230. In other examples, the groups may be specified by the administrator using the IM client 290, as will be discussed subsequently in greater detail. Also to be discussed subsequently in greater detail are the "Limit" columns of the printer-group table 430 and the user-group table 450.

Referring once again to FIG. 2, the administrator 206 may also interact with the AI 212 to execute commands or queries. For example, the administrator 206 can obtain cumulative usage information by sending a query via path 216 to the CURS 240. The CURS 240 executes the query by obtaining and/or calculating the usage information requested in the query through access to the database 236 via path 242, and returns a response to the query to the AI 212 via path 216.

Although the paths for doing so are not shown on FIG. 2 for purposes of simplicity, the AI 212 may also interact via commands and queries with the CDMS 230; or with the printer 280 via the XMPP service 250. For example, the administrator 206 may interact with the AI 212 to send a command to the CDMS 230 at the end of a billing cycle to reset some or all of the cumulative usage data in the usage table 410.

Returning now to the interaction of the XMPP service 250 with the IM Client 290, the XMPP service 250 is structured to send the usage data 244 to the IM client 290 as usage data 252 in near-real-time after the completion of printing the print job 202. Near-real-time communication of the usage data 244 to the IM client 290 can occur because the printer 180 sends to the CBPS 210 the XML message 282 that specifies, or that can be used to determine, consumable usage by the print job 202 right after the completion of the printing of the print job 202, and because the CBPS 210 in response promptly calculates the usage data 244 and sends it to the IM client 290.

The XMPP service 250 sends the usage data 252 to the IM client 290 as an instant message. An instant message is a way to send text-based messages over the Internet in real-time from a sender to a receiver. In other words, it is a form of bidirectional on-line chat. The IM client 290 is software on a computing device that supports instant messaging protocol. The software may be a stand-alone application installed on the computing device, or may be an add-in or option for a web browser. An administrator or a user participates in an instant message chat by interacting with the IM client 290. In general terms, one IM client communicates with another IM client through the facilitation of an IM server. In the case of the CBPS 210, the XMPP service 250 provides the functions of the IM server, and the IM client 290 communicates with automated IM clients in the CBPS 210 which are instantiated as applicable by the XMPP service 250. As defined herein and in the appended claims, the terms "automated" or "automatically" (and like variations thereof) shall be broadly understood to mean controlled operation of an apparatus, system, and/or process using computers and/or mechanical/electrical devices without the necessity of human intervention, observation, effort and/or decision. An automated IM client of the CBPS 210 may correspond to a user 204, a printer 280, a group of users 204, or a group of printers 280. These automated clients send (i.e. push) instant messages containing cumulative consumable usage data to the IM client 290.

Figure 5:
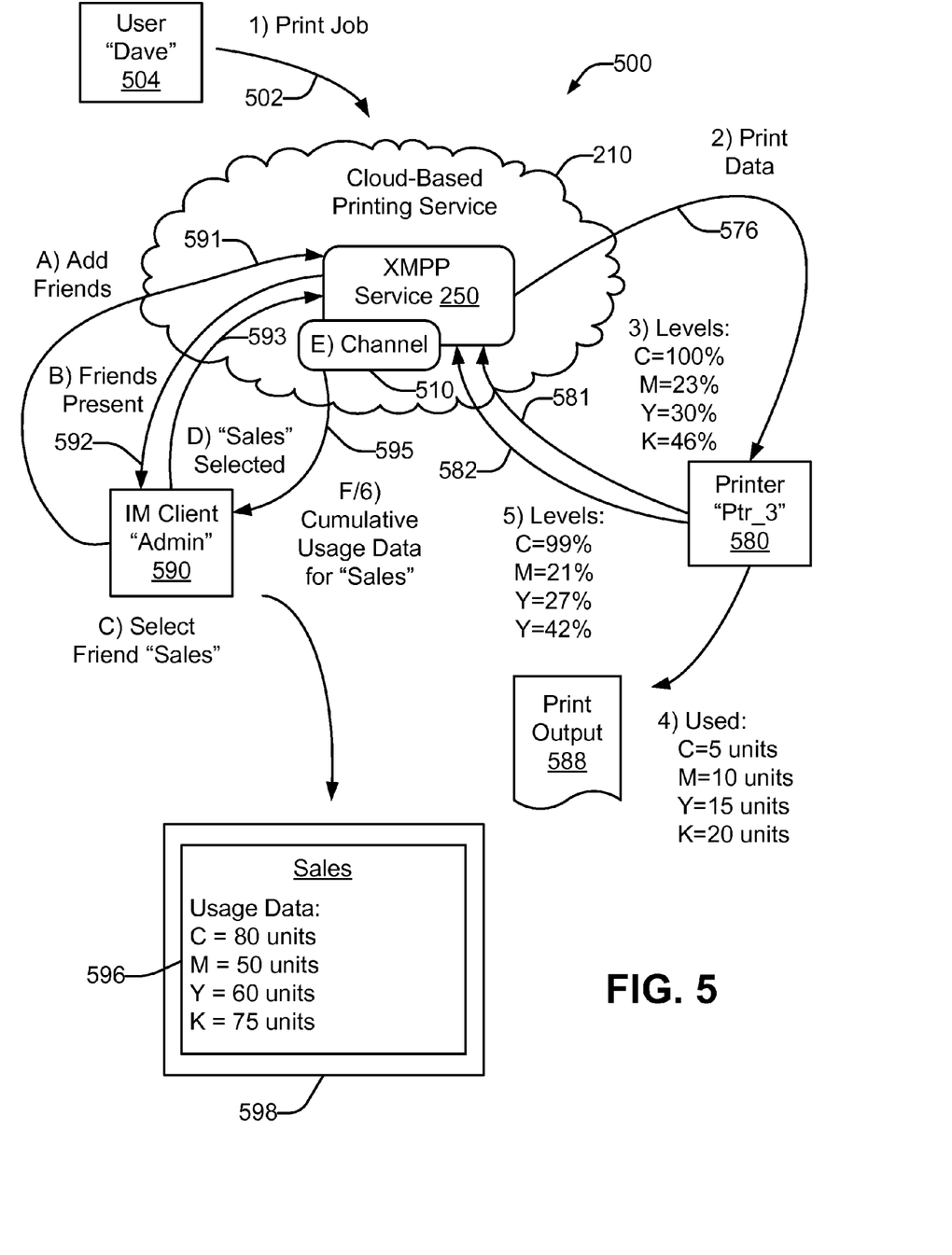
FIG. 5 is an example of the operation of the cloud-based printing service of FIG. 2 in processing a print job and interacting with an instant message client in accordance with an example of the present disclosure.

Considering now the interactions involved in instant messaging and the operation of the XMPP service 250, the IM client 290, and the automated IM clients in greater detail, and with reference to FIG. 5 along with FIG. 2, the IM client 290 first connects to the IM server function of the XMPP service 250. In some examples, this may involve the IM client 290 logging in using a name and typically a password. Once logged in, the XMPP service 250 will indicate to the IM client 290 the names of any "friends" (also called "contacts" or "buddies") with whom the IM client 290 may initiate an on-line IM "chat session". By default, the IM client 290 has no friends. He adds friends by sending to the XMPP service 250 via an IM administrative path 292 the names of the friends which he wishes to add to his "friend list" (also called "contact list" or "buddy list"). These friend names correspond to a UserID, PrinterID, User-GroupID, or Printer-GroupID as stored in the usage database 236. If the friend names entered by the IM client 290 are valid (i.e. if they exist in the usage database 236), the XMPP service 250 accepts the addition of the friend name to the friend list. The XMPP service 250 also then typically indicates the "presence" on-line of these friends. The IM client 290 then may select from his friend list a friend who is on-line and with which he desires to "chat". The XMPP service 250, in response, opens a window on the computing device running the IM client 290 for the corresponding "chat session". The XMPP service 250 also instantiates an IM channel 510 for communication between the CURS 240 and the IM client 290. The cumulative consumable usage data 244 generated by the CURS 240 is sent to the IM client 290 as an instant message transmitted over this IM channel. The IM channel continues in existence as long as the chat session is open. When the IM client 290 closes the chat session window, the corresponding IM channel is terminated. The IM client 290 can have multiple chat sessions operational at a time; for example, he may desire to get cumulative consumable usage information for both UserID "Jim" and PrinterID "Ptr_2" in the same IM session.

Consider now, with reference to FIG. 5, the operation of the printing system 500 in printing an example print job. Assume that a user 504 named "Dave" (also his UserID), who is a salesman for an organization which has a fleet of printers which are connected to the CBPS 210, submits a print job 502 in step 1). The printer fleet includes a printer 580 whose PrinterID is "Ptr_3". "Dave" specifies "Ptr_3" as the target printer on which his print job 502 is to be printed. In the same or similar manner as has been described heretofore with reference to FIG. 2, at step 2) print data 576 is generated for the print job 502, and "Ptr_3" is notified that it is ready for printing. Prior to printing the print job, at step 3), "Ptr_3" sends a first XML message 581 to the CBPS 210 that includes the remaining consumable levels. Assume that these levels are the same as the "Before" levels in Table 2: C=100%; M=23%; Y=30%; and K=46%. Then at step 4), the print data 576 is printed by the printer 580 to produce hard-copy print output 588. Assume that to print the output 588, the printer 580 uses the following amount of consumables (in this example, different color inks): C=5 units; M=10 units; Y=15 units; and K=20 units. Then at step 5), "Ptr_3" sends a second XML message 582 to the CBPS 210 that includes the remaining consumable levels. Assume that these levels are the same as the "After" levels in Table 2: C=99%; M=21%; Y=27%; and K=42%. As a result, record 412 of the usage table 410 gets updated in a similar way as has been explained heretofore to the following cumulative consumable usage amounts: C=35+5=40 units; M=15+10=25 units; Y=20+15=35 units; and K=10+20=35 units.

Asynchronous to steps 1) through 6), steps A) through E) are performed in the instant message environment. Assume that the user of the computing device on which IM client 590 is executed is an administrator of the organization's fleet of printers. At step A), and after logging in to the XMPP service 250, the administrator interacts 591 with the IM client 590 to add friends to his friend list. Assume, for example, that he adds the automated friends printer "Ptr_1", printer "Ptr_3", user "Jim" printer group "Bldg_B", and user group "Sales" as friends. These friends will typically be persistent through cycles of logging off and logging back into the XMPP service 250. Upon logging in and having adding these friends, at step B) the XMPP service 250 indicates 592 in the friend list of the IM client 590 that friends "Ptr_1", "Ptr_3", "Jim", "Bldg_B", and "Sales" are all "present" (i.e. on-line). At step C), the administrator selects his friend "Sales" from his friend list. At step D), in response, the IM client sends 593 the selection of "Sales" to the XMPP service 250. At step E), the XMPP service 250, in response, instantiates an IM channel 510 corresponding to the automated IM client for "Sales" and a chat session between the IM client 590 and the automated IM client "Sales" is established.

Now, assume that the IM channel 510 has been established by the time the CDMS 230 notifies the CURS 240 via path 238 that the usage data has been updated following step 5). The CURS 240 is aware that the usage data associated with the IM channel 510 is for User-GroupID "Sales". As a result, the CURS 240 obtains the relevant data from the usage database 236 via the CDMS 230, calculates the usage data for "Sales", and sends the calculated usage data for "Sales" via path 244 to the XMPP service 250.

Examining an example of this calculation in more detail, it can be appreciated from the user-group table 450 that the cumulative consumable usage data for the User-GroupID "Sales" is the sum of the cumulative consumable usage data for UserID "Dave" and "Zeke". The CURS 240 first obtains the user-group table 450 to determine the UserID that correspond to User-GroupID "Sales". Then the CURS 240 obtains all the records in the usage table 410 that correspond to UserIDs "Dave" and "Zeke", the UserIDs which correspond to User-GroupID "Sales": namely, records 414 and 416, and record 412 (with the usage data as updated above, rather than as illustrated in FIG. 4). The CURS 240 then sums the cumulative consumable usage data for each consumable of these records:

$C=10+30+40=80$ units;

$M=5+20+25=50$ units;

$Y=15+10+35=60$ units; and $K=25+15+35=75$ units.

Then, at step F/6), the CURS 240 uses the IM channel 510 to send an instant message 595 containing the cumulative consumable usage data for "Sales" to the IM client 590. The cumulative consumable usage data for "Sales" 596 is displayed to the administrator in the chat session window 598 of the computing device on which the IM client 590 is operating.

In addition to the above-described operation of usage data being pushed to the IM client 290 via a chat session, and with reference to FIG. 2, an administrator or user at the computing device can send a command or query 294 to the CPBS 210 in the form of an instant message sent from the IM client 290 to the CPBS 210 via the chat session and the IM channel 510. FIG. 2 illustrates that the IM command/query 294 is passed through to the CURS 240, which in the case of a query returns a response by the same path. For example, the administrator may open a chat session via the IM client 290 with printer-group friend "Bldg_B", and then send a query to the CURS 240 to obtain the cumulative consumable usage data for "Bldg_B".

Also, although the paths for doing so are not shown on FIG. 2, for purposes of simplicity, it can be appreciated that an IM command/query 294 can also be sent to, and the response received from, the CDMS 230 or the printer 280 as appropriate for the particular command. For example, the administrator may open a chat session via the IM client 290 with printer friend "Ptr_3", and then send a query to the corresponding printer 280 to obtain the currently remaining levels of the consumables in the printer 280 which corresponds to "Ptr_3".

Based on the usage data received by the administrator at the IM client 290 during a chat session, the administrator can take action to control printing costs. For example, he can inform the appropriate manager in the organization or enterprise of the amount of consumables used, so that the manager can ensure there are sufficient funds to pay for the consumables used, or to arrange that his group or department reduce the amount of printing that is performed.

The administrator can also configure automatic consumable usage limits for a printer, user, printer group, or user group that will disallow printing of print jobs on a particular printer or any printer in a printer group, or printing of print jobs by a particular user or any user in a user group, when the CBPS 210 determines, upon submission of a print job to the ORS 260, that the consumable usage limit has been exceeded. These usage limits may be set by the administrator via the AI 212, or alternatively via an IM command query 294 from the IM client 290.

Considering the operation of automatic consumable usage limits in more detail, and with reference to FIG. 4, both the printer-group table 430 and the user-group table 450 include "Limit" columns. Each row of the printer-group table 430 includes a Limit field for the corresponding PrinterID, while each row of the user-group table 450 includes a Limit field for the corresponding UserID. The Limit field specifies whether there is a limit on the amount of consumable usage by a printer (in table 430) or a user (in table 450). The value of the Limit field indicates the limit on consumable usage by the printer or user beyond which printing of print jobs submitted by that user, or for printing on that printer, will be rejected. A reserved value of the Limit field may be defined to indicate that there is no limit on consumable usage of the printer or user. A Limit field value of zero for a PrinterID can effectively deactivate a printer, preventing it from being used to print any print jobs. In some examples, the value in the Limit field specifies the limit of each consumable individually (e.g. the value is the limit for C, for M, for Y, and for K ink usage individually). In other examples, the value in the Limit field specifies the limit of each consumable collectively (e.g. the value is the limit for sum of C, M, Y, and K ink usage). In still other examples, tables 430,450 may contain additional Limit fields, such as one Limit field per consumable.

As has been discussed previously, when a print job 202 is submitted by a user 204 to the ORS 260, the ORS sends the UserID and PrinterID to the CURS 240 to determine whether a limit is exceeded. The CURS 240 accesses the appropriate data in the usage database 236 via data access path 242 to make this determination. The CURS 240 determines whether the limit associated with the printer 280 corresponding to the PrinterID has been exceeded, and determines whether the limit associated with the user 204 corresponding to the UserID has been exceeded. The CURS 240 also determines whether the limit associated with any Printer-GroupID associated with the PrinterID, and any User-Group ID associated with the UserID, has been exceeded. If any of these four tested limits have been exceeded, the CURS 240 will set the Limit Flag 264 to inform the ORS 260 to reject the submitted print job 202 without printing it.

The cumulative consumable usage for a given PrinterID is calculated by summing the consumable usage of all rows in the usage table 410 that have the given PrinterID. Similarly, the cumulative consumable usage for a given UserID is calculated by summing the consumable usage of all rows in the usage table 410 that have the given UserID.

The cumulative consumable usage for a Printer-GroupID is calculated by first identifying in the printer-group table 430 all PrinterIDs that correspond to a given Printer-GroupID, and then calculating the cumulative consumable usage for all rows of the usage table 410 that have any of these PrinterIDs. The cumulative consumable usage for a User-GroupID is calculated by first identifying in the user-group table 450 all UserIDs that correspond to a given User-GroupID, and then calculating the cumulative consumable usage for all rows of the usage table 410 that have any of these UserIDs.

The limit for a given PrinterID is read directly from the Limit field of the row of the printer-group table 430 corresponding to the PrinterID. The limit for a given UserID is read directly from the Limit field of the row of the user-group table 450 corresponding to the UserID.

The limit for a Printer-GroupID is calculated by first identifying in the printer-group table 430 all PrinterIDs that correspond to a given Printer-GroupID, and then summing the Limit entry values for all of these PrinterIDs. For example, the limit for Printer-GroupID "Bldg_B" is calculated as 300+500=800 units.

The limit for a User-GroupID is calculated by first identifying in the user-group table 430 all UserIDs that correspond to a given User-GroupID, and then summing the Limit entry values for all of these UserIDs. For example, the limit for User-GroupID "Sales" is calculated as 425+475=900 units.

Figure 6A:
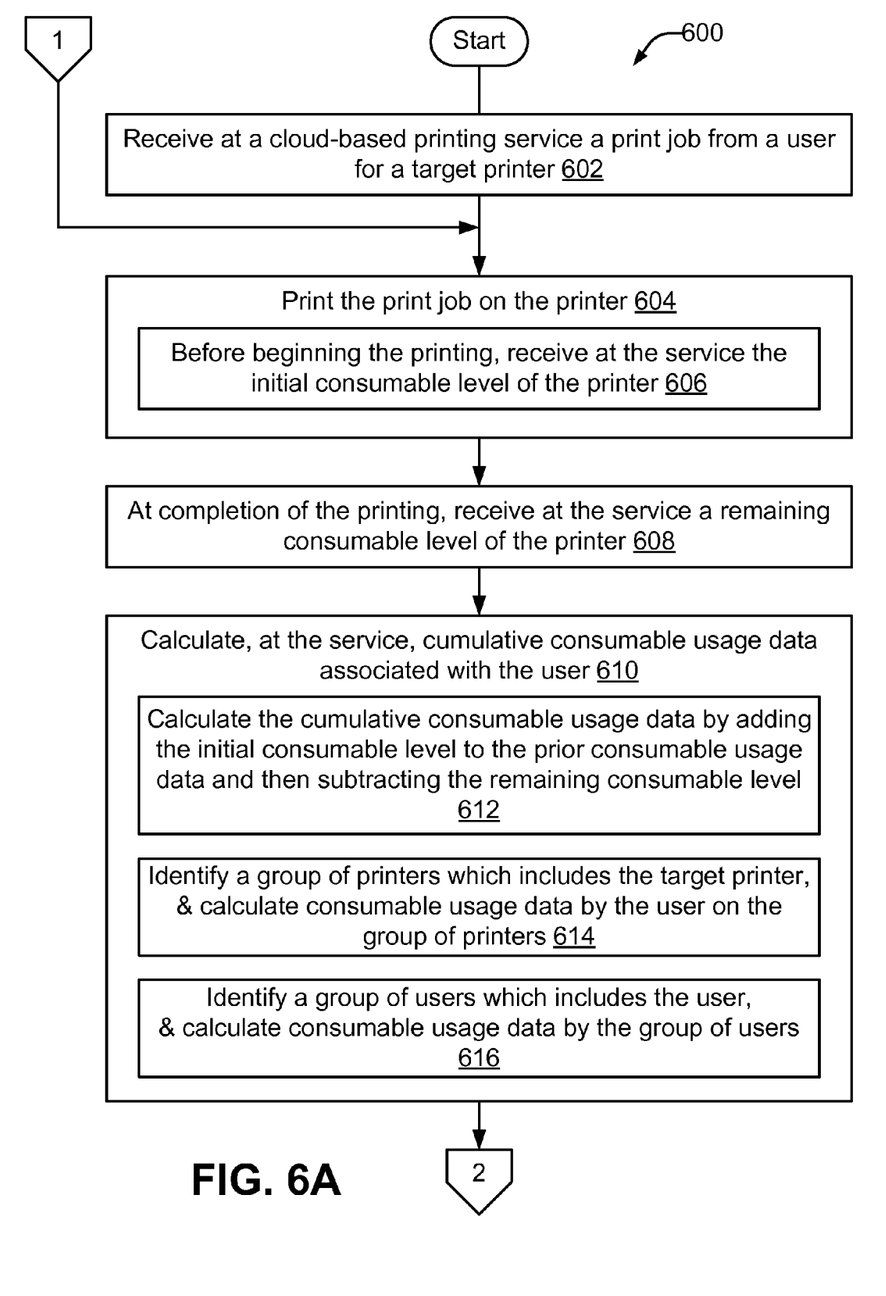
FIGS. 6A-6B are flowcharts according to an example of the present disclosure of a method of monitoring printer consumable usage.
Figure 6B:
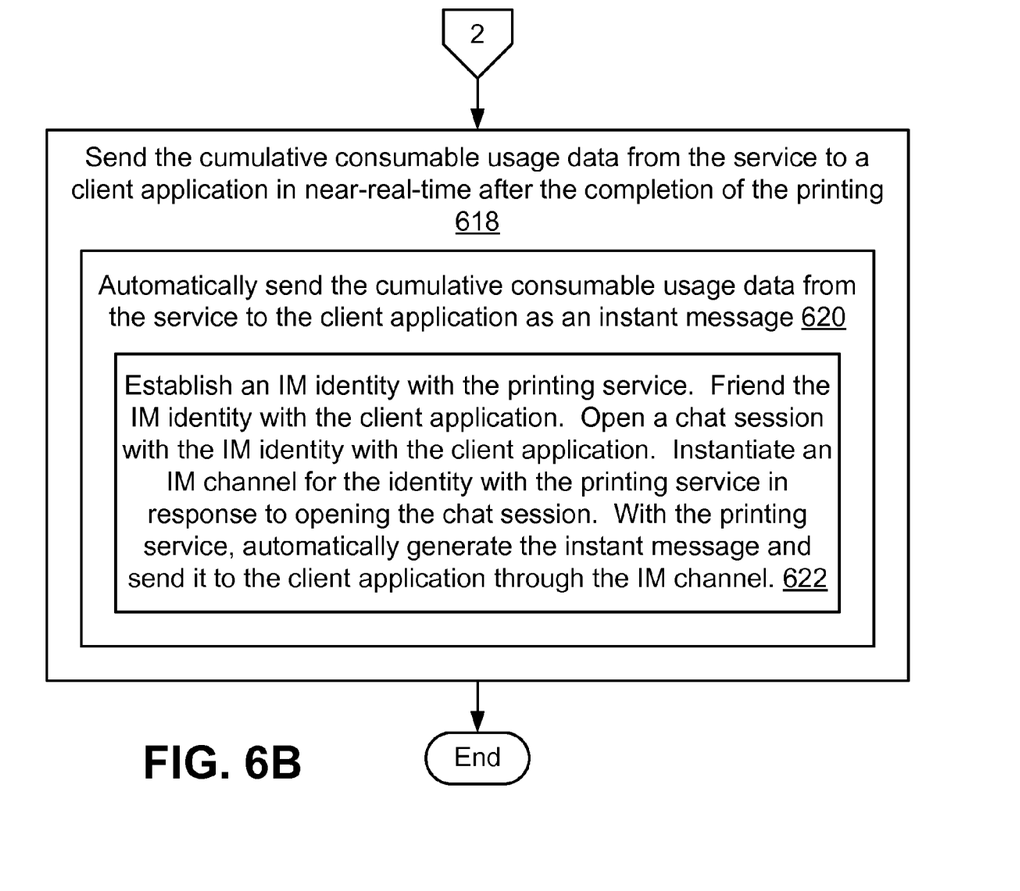

Consider now, with reference to FIGS. 6A-6B, a flowchart of the operation of a cloud-based printing system. Alternatively, the flowchart of FIGS. 6A-6B may be considered as steps in a method of monitoring printer consumable usage. One or more various computing devices or processors may perform some or all of the steps of the method in the form of non-transitory computer-readable and -executable instructions stored in a memory that is part or and/or accessible by the computing device or processor. Some of the various computing devices or processors may be configured as one or more servers executing server applications or services, while others may be configured as one or more clients executing client applications.

The method 600 begins, at 602, by receiving at a cloud-based printing service, from a user, a print job for a target printer. At 604, the print job is printed on the printer. In some examples, before beginning the printing, an initial level of one or more consumables of the printer is received at the printing service at 606. At 608, at completion of the printing, a remaining level of the one or more consumables of the printer is received at the printing service. At 610, cumulative consumable usage data associated with the user is calculated at the printing service. In some examples, at 612, the cumulative consumable usage data is calculated by adding the initial consumable level to the prior consumable usage data and then subtracting the remaining consumable level. In some examples, at 614, a group of printers which includes the target printer is identified, and consumable usage data by the user on the group of printers is calculated. In some examples, at 616, a group of users which includes the user is identified, and consumable usage data by the group of users is calculated. At 618, the cumulative consumable usage data is sent from the service to a client application in near-real-time after the completion of the printing. In some examples, at 620, the cumulative consumable usage data is automatically sent from the service to the client application as an instant message. In some examples, at 622, an instant message identity is established with the printing service; the client application friends the instant message identity; a chat session is opened with the instant message identity by the client application; an instant message channel for the identity is instantiated with the printing service in response to opening the chat session; and the printing service, automatically generates the instant message and sends it to the client application through the instant message channel.

Figure 7:
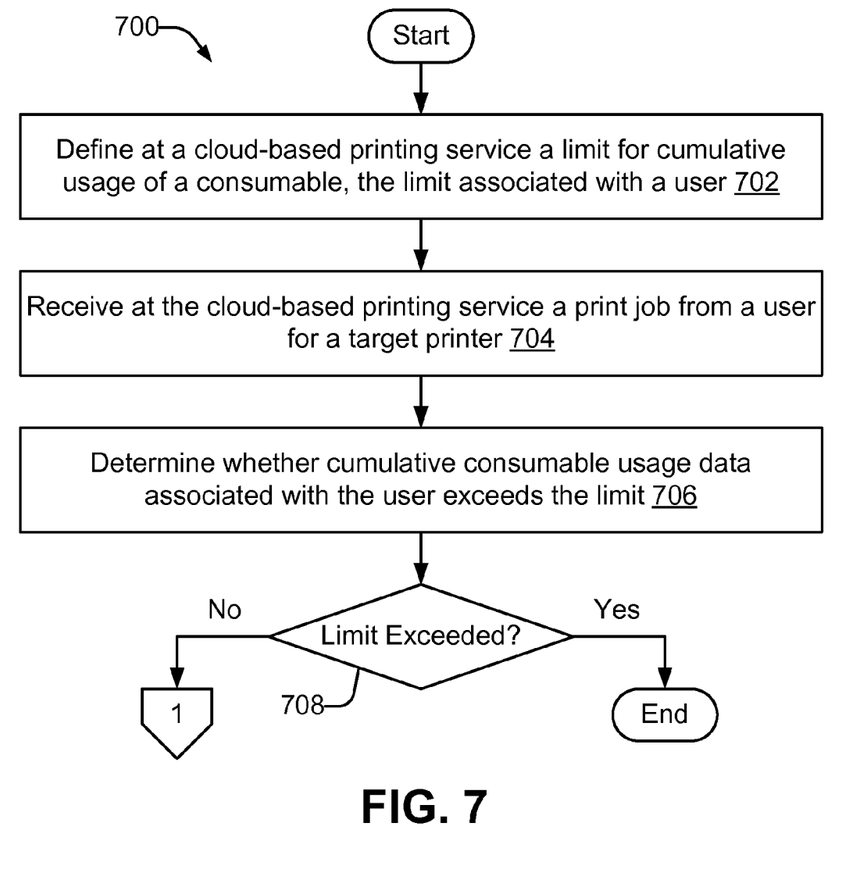
FIG. 7 is a flowchart according to an example of the present disclosure of a method of controlling printer consumable usage.

Consider now, with reference to FIG. 7, another flowchart of the operation of a cloud-based printing system. Alternatively, the flowchart of FIG. 7 may be considered as steps in a method of controlling printer consumable usage. One or more various computing devices or processors may perform some or all of the steps of the method in the form of non-transitory computer-readable and -executable instructions stored in a memory that is part or and/or accessible by the computing device or processor. Some of the various computing devices or processors may be configured as one or more servers executing server applications or services, while others may be configured as one or more clients executing client applications.

The method 700 begins, at 702, by defining at a cloud-based printing service a limit for cumulative usage of a consumable, the limit associated with a user. At 704, a print job from the user for a target printer is received at the cloud-based printing service. At 706, it is determined whether cumulative consumable usage data associated with the user exceeds the limit. If the limit is exceeded ("Yes" branch of 708), then the method ends without printing the print job. If the limit is not exceeded ("No" branch of 708), then the method branches to block 604 (FIG. 6) to print the print job.

Figure 8:
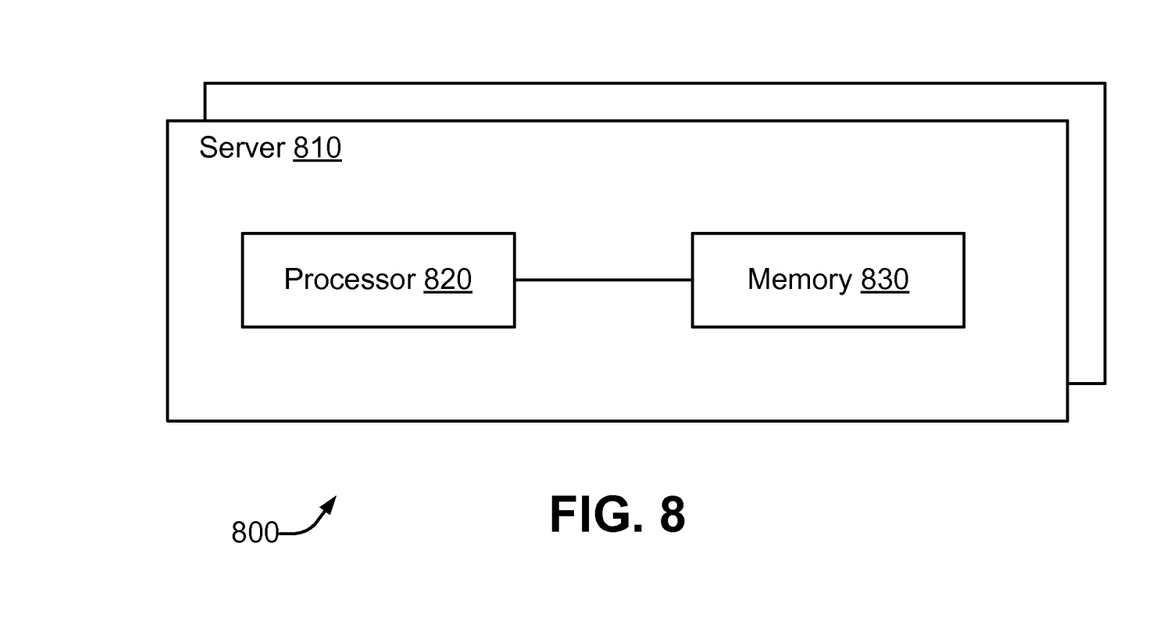
FIG. 8 is a block diagram of a hardware architecture of the cloud-based printing service of FIGS. 1-2 in accordance with an example of the present disclosure usable to execute the methods of FIGS. 6A-6B and 7.

Considering now a hardware architecture 800 of a cloud-based printing system usable with the methods 600, 700, and with reference to FIG. 8, the architecture may be employed with the CBPS 110 (FIG. 1) or 210 (FIG. 2). The architecture 800 includes at least one server 810. A server 810 includes at least one processor 820 that is communicatively coupled to a memory 830. The memory 830 is a non-transitory computer-readable storage medium on (or in) which instructions executable by the processor 820 are, or can be, stored. In various examples, the instructions stored in a particular memory 830 may correspond to at least a portion of the methods 600, 700. In some examples, the various services of the CBPS 110, 210 may each be implemented using one or more different servers 810. In some examples, multiple different services of the CBPS 110, 210 may be implemented on one or more of the same servers 810. Some or all of the multiple servers 810 may be communicatively coupled to others of the servers 810 over a network (not shown), such as for example the Internet.

From the foregoing it will be appreciated that the printing services and methods provided by the present disclosure represent a significant advance in the art. Consumable monitoring can be done in near-real-time. The monitoring and management of consumables can be done at the organization or enterprise level, as well as at lower sub-levels such as a business unit, a department, a functional area, and the like. Consumable usage of a user can be monitored and controlled even when he or she is using multiple printers of the organization. Consumable usage of a printer can be monitored and controlled even when a number of users are printing on it. As a result of the monitoring, a proper level of supplies of the consumables may be ordered, obtained, and maintained.

Although several specific examples have been described and illustrated, the disclosure is not limited to the specific methods, forms, or arrangements of parts so described and illustrated. For example, examples of the disclosure are not limited to consumables that are the marking colorant, such as ink or toner, but can be used with other types of consumables such as print media and finishing supplies. In addition, while the usage data has typically been described as text-based information that is sent to a client as an instant message, in other examples the usage data may be sent in graphical form, and may be sent by means other than instant messages, such as for example as an email message, an SMS message, a data file transfer, or the like. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. Similarly, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the disclosed examples. Further, methods or steps discussed within different figures can be added to or exchanged with methods or steps in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method of monitoring printer consumable usage, comprising:
   receiving at a cloud-based printing service a print job from a user for a target printer, the target printer also usable for printing by other users of the service;
   providing the print job from the service to the printer for printing;
   receiving at the service job data indicative of consumable consumption for the print job;
   calculating, at the service, cumulative consumable usage data associated with the user but not the other users from the job data and prior consumable usage data; and
   pushing, in near-real-time responsive to the completion of the printing, an instant message having the cumulative consumable usage data from the service to a client application via a preexisting chat session established responsive to a request from the client application to become an instant message friend of the service.

2. The method of claim 1, wherein the client application is an instant message client, and wherein the sending comprises:
   sending the cumulative consumable usage data from the service to the client application as an instant message.

3. A method of monitoring printer consumable usage, comprising:
   receiving at a cloud-based printing service a print job from a user for a target printer, the target printer also usable for printing by other users of the service;
   printing the print job on the printer;
   receiving at the service job data indicative of consumable consumption for the print job;
   calculating, at the service, cumulative consumable usage data associated with the user but not the other users from the job data and prior consumable usage data; and
   sending the cumulative consumable usage data from the service to a client application in near-real-time after the completion of the printing by
      the printing service establishing an instant messaging identity,
      the client application becoming an instant message friend of the instant messaging identity,
      the client application opening a chat session with the instant messaging identity,
      the printing service instantiating an instant messaging channel for the identity in response to the opening, and
      the printing service automatically generating an instant message having the cumulative consumable usage data and sending the instant message to the client application through the channel.

4. The method of claim 1, comprising:
   identifying a group of printers which includes the target printer,
   wherein the calculating comprises calculating consumable usage data by the user on the group of printers.

5. The method of claim 1, comprising:
   identifying a group of users which includes the user,
   wherein the calculating comprises calculating consumable usage data by the group of users.

6. The method of claim 1, wherein the user is associated with a business entity, and wherein the cloud-based printing service is usable, by other users not associated with the business entity, to print print jobs.

7. The method of claim 1, wherein the receiving comprises:
   before beginning the printing, receiving at the service an initial consumable level of the printer; and
   at completion of the printing, receiving at the service a remaining consumable level of the printer, wherein the consumable consumption corresponds to the difference between the initial consumable level and the remaining consumable level.

8. The method of claim 7, wherein the calculating comprises:
   calculating the cumulative consumable usage data by adding the initial consumable level to the prior consumable usage data and then subtracting the remaining consumable level.

9. The method of claim 1, comprising:
   in response to the receiving and prior to the printing, determining whether a limit for cumulative usage of the consumable by the user has been exceeded;
   if the limit has been exceeded, aborting the print job; and
   if the limit has not been exceeded, initiating the printing.

10. A cloud-based printing service, comprising:
    a device event service to receive from a target printer registered with the cloud-based printing service job data indicative of consumable consumption of a print job printed by the printer for a user;
    a consumable data management service to calculate, using the job data, cumulative consumable usage data associated with the user;
    a consumable usage reporting service to generate, using the cumulative consumable usage data, information requested by a client external to the cloud-based printing service; and
    a communications service to push, in near-real-time responsive to completion of the printing, an instant message having the information to the client via a preexisting chat session established responsive to a request from the client to become an instant message friend of the printing service.

11. The printing service of claim 10, comprising:

an on-ramp service to receive the print job from the user and either to allow the print job if a consumable usage limit associated with the user has not been exceeded or to reject the print job if the consumable usage limit associated with the user has been exceeded, wherein the consumable usage reporting service is structured to compare the consumable usage limit associated with the user with the cumulative consumable usage data associated with the user.

12. The printing service of claim 10, wherein the communications service is further configured to:

inform the client about the presence in the cloud-based printing service of an instant message (IM) friend associated with the information requested by the client;

responsive to the client opening the chat session with the IM friend, instantiate between the IM client and the consumable usage reporting service an IM channel corresponding to the IM friend; and send the instant message to the client via the IM channel.

13. The printing service of claim 10, wherein the communications service is further structured to:

receive from the client an instant message including a command;

send the command to the consumable usage reporting service;

receive a response to the command from the consumable usage reporting service; and send the client an instant message including the response.

14. The printing service of claim 10, comprising:

a database coupled to the consumable data management service;

the consumable data management service further coupled to the consumable usage reporting service to store in the database a first table associating a printer and a user with cumulative consumable usage data for print jobs from the user printed on the printer, a second table associating a printer with a printer group, and a third table associating a user with a user group.

15. The printing service of claim 10, comprising:

a worker service to render the print job into print data printable by the target printer.

16. The method of claim 1, wherein the cumulative consumable usage data is pushed to the client application as a textual instant message.

17. The method of claim 1, wherein the print job is not sent to the printer by the client application.

\* \* \* \* \*

UNITED STATES PATENT AND TRADEMARK OFFICE
CERTIFICATE OF CORRECTION

| | |
|---|---|
| PATENT NO. | : 9,104,344 B2 |
| APPLICATION NO. | : 13/750108 |
| DATED | : August 11, 2015 |
| INVENTOR(S) | : Kumaravel Ganesan et al. |

Page 1 of 1

It is certified that error appears in the above-identified patent and that said Letters Patent is hereby corrected as shown below:

IN THE CLAIMS

In column 16, line 11, in Claim 3, delete "opening," and insert -- openings, --, therefor.

In column 16, line 15, in Claim 3, delete "sending the" and insert -- sending it the --, therefor.

Signed and Sealed this
Sixteenth Day of February, 2016

Michelle K. Lee
*Director of the United States Patent and Trademark Office*